(12) United States Patent
Lee et al.

(10) Patent No.: US 6,906,986 B2
(45) Date of Patent: Jun. 14, 2005

(54) APPARATUS AND METHOD OF MEASURING VIBRATION QUANTITY AND METHOD OF DESIGNING LOOP

(75) Inventors: Moon-noh Lee, Gyeonggi-do (KR); Won Kim, Gyeonggi-do (KR); Sung-ro Go, Gyeonggi-do (KR); Dong-jin Lee, Gyeonggi-do (KR); Hyun-seok Yang, Seoul (KR); Hong-gul Jun, Gyeonggi-do (KR)

(73) Assignee: Samsung Electronics Co., Ltd, Suwon-Si (KR)

( * ) Notice: Subject to any disclaimer, the term of this patent is extended or adjusted under 35 U.S.C. 154(b) by 468 days.

(21) Appl. No.: 10/230,373

(22) Filed: Aug. 29, 2002

(65) Prior Publication Data

US 2003/0053387 A1 Mar. 20, 2003

(30) Foreign Application Priority Data

Aug. 29, 2001 (KR) ........................................ 2001-52561

(51) Int. Cl.$^7$ ................................................ G11B 7/00
(52) U.S. Cl. ................................. 369/44.36; 369/44.29; 369/44.32
(58) Field of Search .......................... 369/44.29, 44.32, 369/44.35, 44.36, 53.23, 53.28

(56) References Cited

U.S. PATENT DOCUMENTS

| | | | | |
|---|---|---|---|---|
| 4,614,863 A | * | 9/1986 | Sato | 369/44.32 |
| 4,890,273 A | * | 12/1989 | Takeuchi et al. | 369/44.36 |
| 5,150,344 A | * | 9/1992 | Iwase et al. | 369/44.28 |
| 5,768,227 A | * | 6/1998 | Baba | 369/44.28 |
| 6,115,333 A | * | 9/2000 | Igarashi | 369/44.27 |
| 6,377,527 B1 | * | 4/2002 | Hirashima | 369/53.23 |
| 6,560,173 B2 | * | 5/2003 | Shimamura et al. | 369/44.29 |

* cited by examiner

Primary Examiner—Thang V. Tran
Assistant Examiner—Bach Vuong
(74) Attorney, Agent, or Firm—Staas & Halsey LLP (57) ABSTRACT

A vibration quantity measuring apparatus and method, and a loop design method in which a vibration quantity generated in a focus and tracking loop is accurately measured to optimally design a focus and tracking loop of an optical disc drive. The vibration quantity measuring apparatus includes an error gain adjusting unit which adjusts an amplitude of a focus and tracking error which occurs where a disc rotates, so as to maintain the amplitude of the focus and tracking error constant, a loop gain adjusting unit which compares a closed loop phase of a focus and tracking loop and a predetermined reference closed loop phase, and maintains a constant gain of the focus and tracking loop to compensate for a gain difference of an actuator, and a measuring unit which calculates and outputs a vibration quantity using an error adjusted by the error gain adjusting unit and the loop gain adjusting unit, and an output of a controller which controls a focus and tracking of the disc. According to the methods and apparatus, a focus and tracking vibration quantity that occur differently depending on the type of a disc, on which data is recorded on or read from, or depending on a speed factor of a disc drive, can be measured.

32 Claims, 8 Drawing Sheets

APPARATUS AND METHOD OF MEASURING VIBRATION QUANTITY AND METHOD OF DESIGNING LOOP

CROSS-REFERENCE TO RELATED APPLICATIONS

This application claims the benefit of Korean Application No. 2001-52561 filed Aug. 29, 2001, in the Korean Intellectual Property Office, the disclosure of which is incorporated herein by reference.

BACKGROUND OF THE INVENTION

1. Field of the Invention

The present invention relates to an apparatus and a method of measuring a vibration quantity, and a loop design method in which a vibration quantity generated in a focus and tracking loop is accurately measured to optimally design a focus and tracking loop of an optical disc drive.

2. Description of the Related Art

Where data is recorded on or read from an optical disc, an optical disc drive should accurately focus a recording surface of the optical disc with a focus servo, and have a pickup which accurately follows a track with a tracking servo. A focus and tracking loop should be accurately modeled to accurately control the focus and tracking servos. A focus and tracking controller that controls the focus and tracking loop should be designed so as to achieve a target performance of the optical disc drive.

To optimally model a focus and tracking loop, a vibration quantity occurring in the optical disc drive should be accurately measured. According to the measured vibration quantity and a tracking permissible error, a gain of the focus and tracking loop is determined. Therefore, where a vibration quantity occurring in each frequency can be accurately measured, a loop bandwidth at which the vibration quantity becomes the same as the tracking permissible error can be determined, and the focus and tracking loop can be optimally modeled by the accurately measured vibration quantity.

In prior art, a focus and tracking loop is modeled not by measuring the vibration quantity, but by determining the vibration quantity with a maximum vibration quantity and a maximum vibration acceleration predetermined in a specification. Here, the maximum vibration quantity occurs in a drive, and the maximum vibration acceleration occurs at the speed factor of one time. The specification should be satisfied by the optical disc rather than by the vibration quantity occurring in the drive. That is, after a disc is manufactured, where a maximum vibration quantity and a maximum vibration acceleration at the speed factor of one time are less than the values determined in the specification, the manufactured disc is regarded as a normal one.

Though the focus and tracking loops of all discs that satisfy the specification should be designed to satisfy the predetermined performance, most disc vibration quantities are less than a value determined in the specification. Therefore, where a focus and tracking loop is designed with these maximum vibration quantity and maximum vibration acceleration, a bandwidth or a gain of the focus and tracking loop becomes unnecessarily great, and an output of a block of the focus and tracking loop is saturated such that the focus and tracking loop is unstable.

To model a vibration quantity at the speed factor of n times, except for the speed factor of one time, according to a method used in modeling a vibration quantity at the speed factor of one time, the maximum vibration acceleration occurring at the speed factor of n times should be known. An acceleration is in proportion to the square of the speed factor. Therefore, where the maximum vibration acceleration at the speed factor of n times is obtained by multiplying the maximum vibration acceleration at the speed factor of one time by the square of n, the maximum vibration acceleration value at a high speed factor becomes too great such that there is no reliability in data. To solve this problem, where only the disc rotates, the maximum vibration acceleration in a focus direction for each speed factor is measured using a Laser Doppler Vibrometer (LDV), and may be used in modeling a focus vibration quantity. However, since it is difficult to measure the vibration in the tracking direction with the LDV, the maximum vibration acceleration for each speed factor cannot be measured.

Where a vibration of a predetermined frequency occurring in an optical disc drive is expressed by sine wave d(w) as in equation 1, the maximum acceleration a(w) can be obtained as a maximum value obtained by differentiating d(w) twice. Using the maximum acceleration, a vibration quantity d(w) for each frequency can be obtained by dividing the maximum acceleration by the square of the frequency.

$$d(w) = d_w \sin wt \qquad (1)$$

$$a(w) = -d_w \sin wt$$

$$d_w = \frac{a_{max}}{w^2}$$

Figure 1:
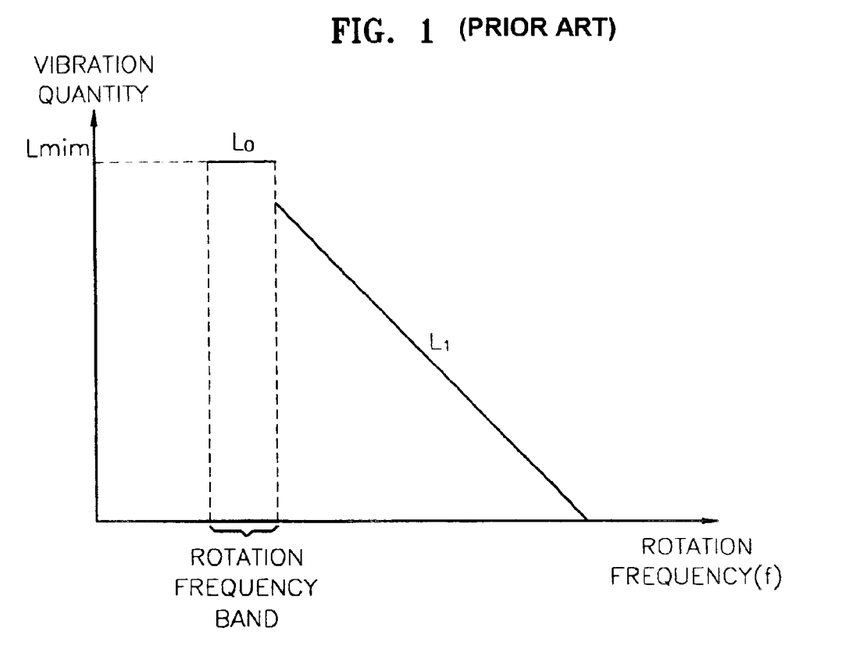
FIG. 1 is a waveform diagram showing a minimum servo loop gain that can be calculated using a vibration quantity and a permissible error.

FIG. 1 shows a waveform diagram illustrating a minimum servo loop gain that can be calculated using a vibration quantity and a permissible error. Generally, the focus maximum vibration of a DVD disc determined in a specification is ±300 μm, and the maximum vibration acceleration at the speed factor of one time is 8 m/sec². The maximum tracking vibration quantity is ±35 μm, and the maximum vibration acceleration at the speed factor of one time is 1.1 m/sec². By dividing the maximum vibration acceleration by the square of a predetermined frequency, the vibration quantity occurring at the predetermined frequency can be obtained. Since the vibration quantity calculated at each frequency cannot be greater than the maximum vibration quantity, the frequency characteristic of the vibration quantity is as shown in FIG. 1.

The vibration quantity obtained by the equation 1 is used to obtain a minimum loop gain for a focus and tracking loop design. The minimum loop gain is defined as a value obtained by dividing a vibration quantity by a permissible error value. A minimum loop gain L0 of a low frequency area which is obtained by dividing the maximum vibration quantity by the permissible error, and a minimum loop gain L1 of a high frequency area which is obtained by dividing the vibration quantity, for each frequency, which is obtained using the maximum vibration acceleration, by the permissible error, are expressed as follows in equation 2, and have the frequency characteristics as shown in FIG. 1.

$$L_0 = 20 \times \log_{10} \frac{d_{max}}{e_{max}(w)} \qquad (2)$$

$$L_1 = 20 \times \log_{10} \frac{a_{max}}{w^2 e_{max}(w)}$$

$$e_{max}(w) = \frac{e_{max}}{3}$$

A focus and tracking loop is designed according to the minimum loop gain obtained as in FIG. 1 so that a gain of the focus and tracking loop is greater than the minimum loop gain, and a target phase margin and a gain margin are obtained. Since the bandwidth of the focus and tracking loop indicates a frequency at which the vibration quantity becomes the same as the permissible error, the vibration quantity should be accurately measured to design a focus and tracking loop having an appropriate bandwidth according to a change in the speed factor.

However, in the prior art, a maximum vibration quantity and a maximum vibration acceleration are specifications for manufacturing discs, and may have no relation with a vibration quantity occurring in an actual drive. Therefore, it is highly probable that a focus and tracking loop is designed to have a gain greater than a needed gain. In addition, since it is not accurately known how much the maximum vibration acceleration increases in accordance with an increasing speed factor, a minimum loop gain cannot be calculated where the speed factor increases. Accordingly, a focus and tracking controller is designed repeatedly until a target performance is satisfied by a trial and error method through lengthy experiments.

A focus and tracking vibration quantity calculated by the prior art maximum vibration quantity and maximum vibration acceleration is always obtained as an identical value in identical types of discs. Therefore, when an actual vibration quantity varies, which depends on the type of a disc and drive, the focus and tracking vibration quantity cannot be reliable data. Since the vibration quantity of an identical disc and drive varies in every measuring time due to chucking or other reasons, it is necessary to measure the vibration quantity when the drive operates. According to the prior art, since it is highly probable that a loop gain is designed to be unnecessarily great, the focus and tracking loop is designed many times.

SUMMARY OF THE INVENTION

Accordingly, it is an object of the present invention to provide a vibration quantity measuring apparatus to design an optimal focus and tracking loop.

Another object of the present invention is to provide a vibration quantity measuring method to design an optimal focus and tracking loop.

Yet another object of the present invention is to provide a loop design method to design an optimal focus and tracking loop by directly measuring a vibration quantity occurring in a drive.

Additional objects and advantages of the invention will be set forth in part in the description which follows and, in part, will be obvious from the description, or may be learned by practice of the invention.

To achieve the above and other objects of the present invention, there is provided a vibration quantity measuring apparatus for a disc recording and reproducing system having a focus and tracking loop including a controller which controls focus and tracking of a disc received in the disc recording and reproducing system and an actuator, in which a vibration occurs in the focus and tracking loop in response to rotating of the disc, the apparatus comprising an error gain adjusting unit which adjusts an amplitude of a focus and tracking error, which occurs in response to the rotating of the disc, and maintains the amplitude constant, a loop gain adjusting unit which compensates for a gain difference of an actuator, wherein the loop gain adjusting unit compares a closed loop phase of the focus and tracking loop and a reference closed loop phase, and maintains a gain of the focus and tracking loop constant, and a measuring unit which calculates and outputs a vibration quantity, using the focus and tracking error adjusted by the error gain adjusting unit and the focus and tracking loop adjusted by the loop gain adjusting unit, and an output of the controller which controls the focus and tracking of the disc.

To achieve the above and other objects of the present invention, there is provided a method of measuring a vibration quantity in a disc recording and reproducing system having a focus and tracking loop including a controller which controls focus and tracking of a disc received in the disc recording and reproducing system and an actuator, in which a vibration occurs in the focus and tracking loop in response to rotating of the disc, the method comprising adjusting an amplitude of a focus and tracking error, which occurs in response to the rotating of the disc, so as to maintain the amplitude constant, compensating for a gain difference of an actuator, wherein the compensating for the gain difference comprises comparing a closed loop phase of the focus and tracking loop and a phase of a nominal closed loop, and adjusting a gain of the focus and tracking loop to be constant, and calculating the vibration quantity based on the adjusted focus and tracking error and the adjusted gain of the focus and tracking loop, and an output of the controller which is compensated by the adjusted focus and tracking error and gain of the focus and tracking loop.

To achieve the above and other objects of the present invention, there is provided a loop design method of a method of measuring a vibration quantity in a disc recording and reproducing system having a focus and tracking loop including a controller which controls focus and tracking of a disc received in the disc recording and reproducing system and an actuator, in which a vibration occurs in the focus and tracking loop in response to rotating of the disc, the method comprising adjusting an amplitude of a focus and tracking error, which occurs in response to the rotating of the disc, so as to maintain the amplitude constant, compensating for a gain difference of an actuator, wherein the compensating for the gain difference comprises comparing a closed loop phase of the focus and tracking loop and a phase of a nominal closed loop, and adjusting a gain of the focus and tracking loop to be constant, calculating the vibration quantity based on the adjusted focus and tracking error and the adjusted gain of the focus and tracking loop, and an output of the controller which is compensated by the adjusted focus and tracking error and gain of the focus and tracking loop, and calculating a minimum gain of the focus and tracking loop by dividing the vibration quantity by a predetermined permissible error, and resetting the gain of the focus and tracking loop using the calculated minimum gain.

BRIEF DESCRIPTION OF THE DRAWINGS

The above objects and advantages of the present invention will become more apparent by describing in detail preferred embodiments thereof with reference to the accompanying drawings in which.

DETAILED DESCRIPTION OF THE PREFERRED EMBODIMENTS

Reference will now be made in detail to the embodiments of the present invention, examples of which are illustrated in the accompanying drawings, wherein like reference numerals refer to the like elements throughout. The embodiments are described below in order to explain the present invention by referring to the figures.

Where a speed factor of a drive changes, a frequency characteristic of a vibration quantity changes, and a focus and tracking loop should be redesigned. If a disc (not shown) being driven is replaced, a focus and tracking loop should be redesigned due to the structure and signal characteristic of the disc. Thus, in a drive (not shown) which has to accommodate many speed factors and disc types, a controller (not shown) should be redesigned for each disc type and speed factor, and the designed data should be maintained in a micom (not shown).

For example, a DVD recording and reproducing apparatus should reproduce data from or record data on discs such as CD-ROMs, CD-Rs, CD-RWs, DVD-ROMs, DVD-Rs, and DVD-RWs, and accordingly, the number of focus and tracking loops that should be designed is great, and the design requires a lengthy period of time. Therefore, a method of optimally designing a focus and tracking loop at the maximum speed includes directly measuring a vibration quantity of a drive, and based on the vibration quantity, designing a focus and tracking controller. As described hereinbefore, the prior art method of modeling a vibration quantity using a maximum vibration quantity and a maximum vibration acceleration, and then designing a focus and tracking loop causes an unnecessarily high loop gain, and for a high speed factor in which a loop design margin is small, the focus and tracking loop should be redesigned.

Therefore, in the present invention, a vibration quantity occurring in an optical disc drive, in response to operating of the optical disc drive, is directly measured instead of using a method in which a vibration quantity is modeled by a maximum vibration quantity and a maximum vibration acceleration, as provided by the prior art.

Where a controller designed by inaccurate conventional data is applied to an actual drive, the controller should be designed repeatedly until a design target is satisfied. Therefore, in the present invention, a vibration quantity occurring in a drive is directly measured such that an optimal focus and tracking loop can be designed, and a design margin can be obtained at its maximum.

Figure 2:
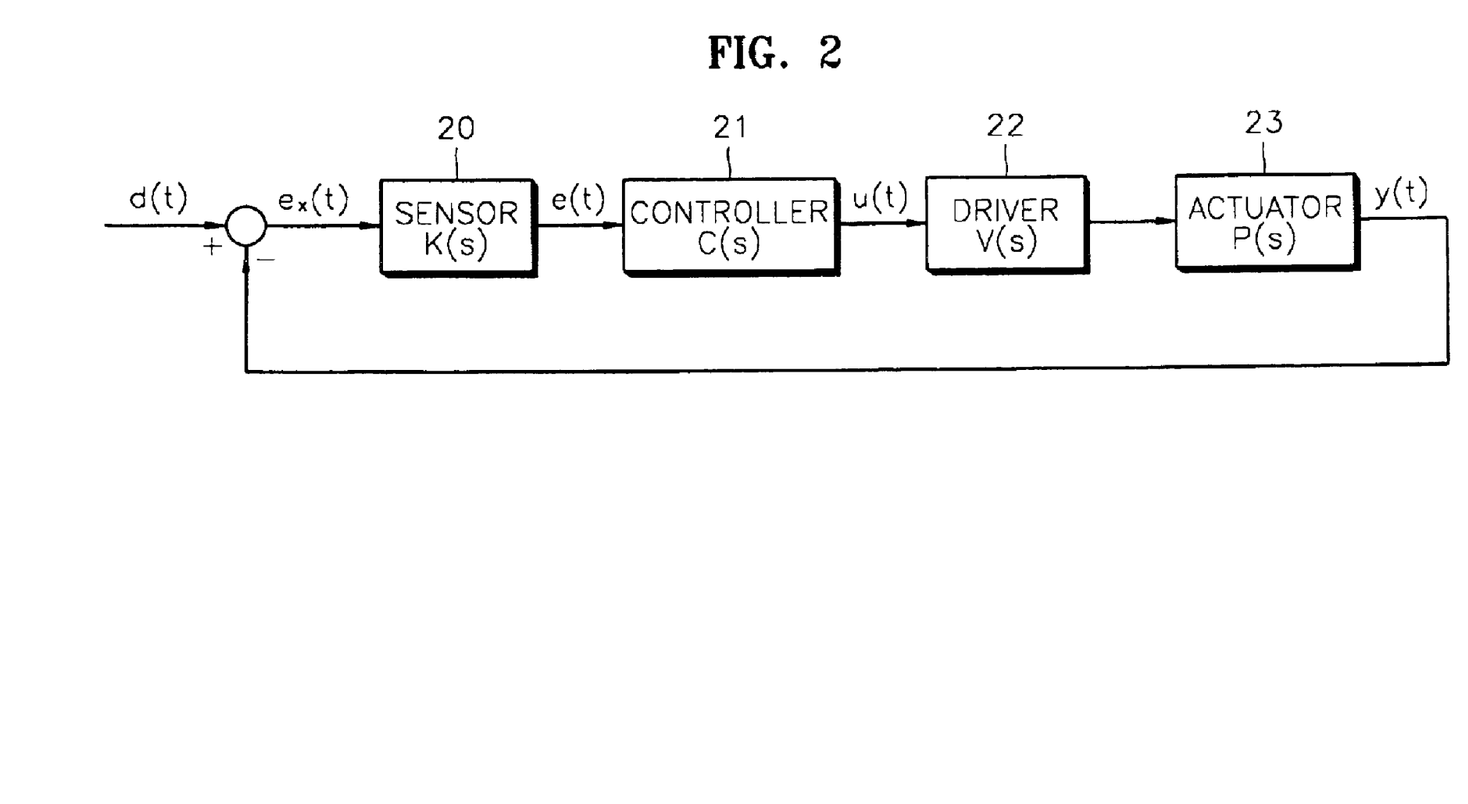
FIG. 2 is a block diagram showing a focus and tracking loop of an optical system according to the present invention.

FIG. 2 shows a focus and tracking loop of an optical system according to the present invention. The focus and tracking loop ("loop") comprises a sensor K(s) 20, a controller C(s) 21, a driver V(s) 22, and an actuator P(s) 23.

The sensor K(s) 20 comprises a photo diode (PD) (not shown) which detects a pickup signal from a disc and an RF chip (not shown) which amplifies the pickup signal and outputs a focus and tracking error e(t). After an extent by which a pickup (not shown) deviates from a fixed focus location or the center of a track by a vibration d(t), which occurs in an optical disc drive of the optical system, is detected by the photo diode, the focus and tracking error e(t) is amplified with a RF chip gain and output. The controller C(s) 21 compensates for the focus and tracking error e(t), which is output from the sensor K(s) 20, and an output u(t) of the controller C(s) 21 is provided to the actuator P(s) 23 through the driver V(s) 22.

The vibration d(t) which occurs in the optical disc drive of the optical system can be expressed as a sum of a vibration quantity ex(t) which the loop does not follow and a vibration quantity y(t) which the loop follows, as presented in the following equation 3-1. Where a vibration quantity measuring apparatus of FIG. 3 is used, the equation 3-1 can be expressed as the following equation 3-2:

$$d(t) = e_x(t) + y(t) \tag{3-1}$$

$$d(s) = \frac{e(s)}{K(s)} + V(s)P(s)u(s) \tag{3-2}$$

Figure 3:
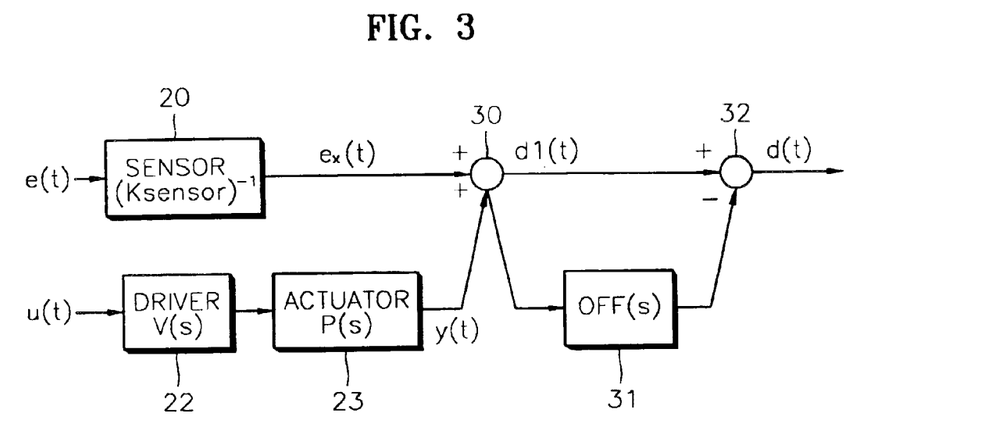
FIG. 3 is a block diagram showing the structure of a vibration measuring apparatus according to the present invention.

FIG. 3 shows the structure of a vibration measuring apparatus according to the present invention. The vibration measuring apparatus comprises a sensor (Ksensor)-1 ("K(s)-1") 20, a driver V(s) 22, an actuator P(s) 23, a first calculating unit 30, an OFF(s) 31, and a second calculating unit 32. Using the vibration measuring apparatus of FIG. 3, a vibration quantity ex(t), which the loop does not follow, can be calculated with a focus and tracking error e(t) and the sensor K(s)-1 20, and a vibration quantity y(t), which the loop follows, can be calculated with an output u(t), the driver V(s) 22, and the actuator P(s) 23. After the OFF(s) 31 removes an offset component from the calculated sum of two vibration quantities, a final vibration quantity d(t) is output.

An operation of the vibration quantity measuring apparatus shown in FIG. 3 is divided into, for example, the following three parts for explanation.

1. Calculation of a vibration quantity ex(t) which the loop does not follow

2. Calculation of a vibration quantity y(t) which the loop follows

3. Calculation of a final vibration quantity d(t)

The vibration quantity measuring apparatus of FIG. 3 will now be explained in detail with reference to FIG. 2.

1. Calculation of a vibration quantity ex(t) which the loop does not follow:

The vibration quantity ex(t) which the loop does not follow is calculated after making an amplitude of the focus and tracking error e(t) constant, and a gain of the sensor K(s)-1 20 constant. To accurately calculate the vibration quantity ex(t), changes in a reflection ratio of a disc should be considered.

The vibration quantity ex(t) which the loop does not follow can be calculated as e(t)K(s)-1. The focus and tracking error e(t) is a value measured in the optical system. The sensor K(s)-1 20 amplifies the focus and tracking error e(t), adjusts a gain of the focus and tracking error e(t) to be constant, and outputs the focus and tracking error e(t).

Figure 4A:
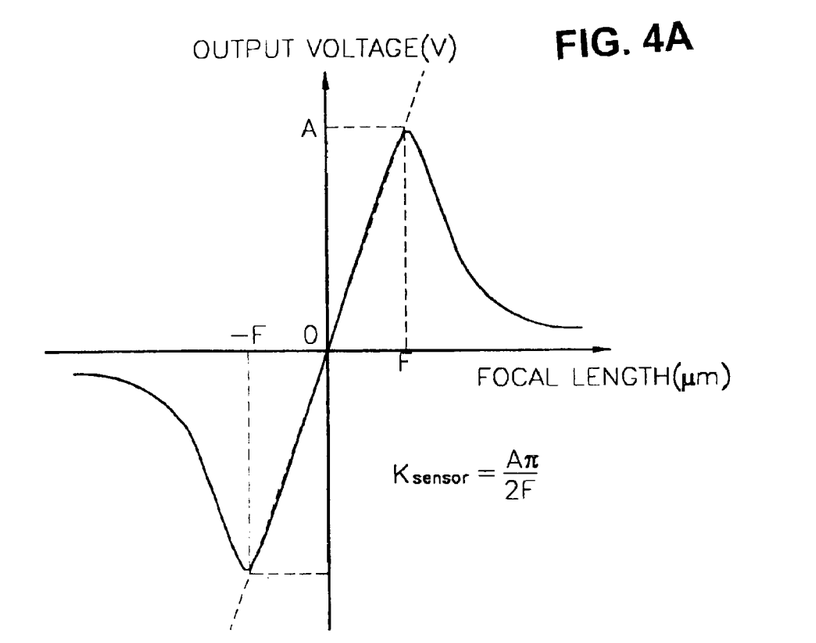
FIG. 4 is a waveform diagram to model a focus sensor gain and a tracking sensor gain of the present invention.
Figure 4B:
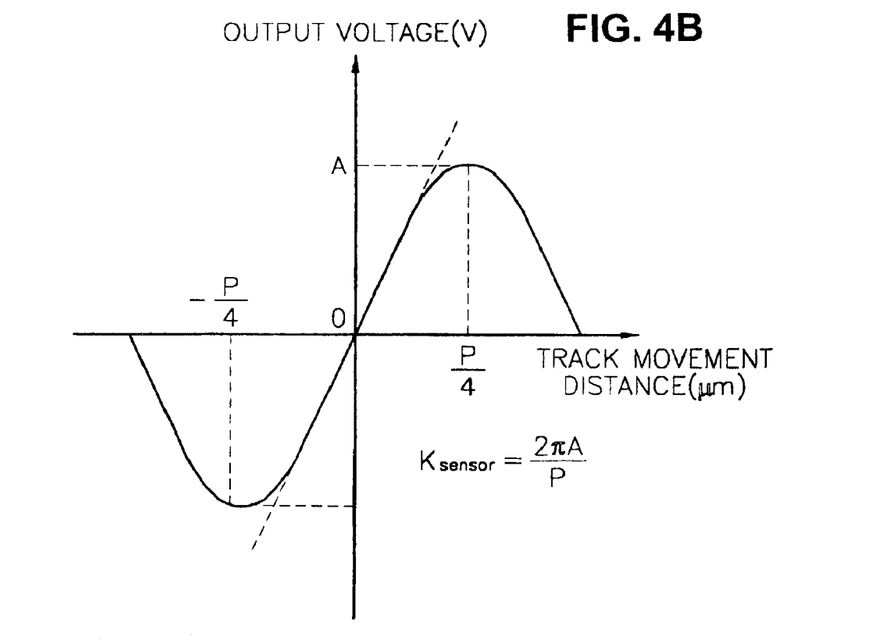

A focus error is output as an S curve shown in FIG. 4A through the sensor K(s)-1 20 which controls a gain of a focus and tracking error, and a tracking error is output as a sine wave shown in FIG. 4B. Since adjusting a gain of a focus error and a gain of a tracking error is possible only in a linear interval, a gain of a focus error and a gain of a tracking error that are adjusted in the sensor K(s)-1 20 can be calculated by a linear interval (2F) on the S curve of the focus error and a track pitch (P) of the sine wave of the tracking error, as presented in the following equation 4:

$$\text{focus error gain} = \frac{A\pi}{2F}$$

(where, A: amplitude, F: a focal length in a linear interval)

$$\text{tracking error gain} = \frac{2\pi A}{P}$$

(where, A: amplitude, P: a track moving distance in a linear interval) (4)

Through FIG. 4, the sensor K(s)-1 20 is modeled to a second low pass filter (LPF), a DC gain of which is Ksensor. Since the limit of a LPF is tens or hundreds of Hz, which is greater than a loop band, it can be approximated to Ksensor-1.

Where laser power and a disc reflection ratio change, an amplitude of a tracking error changes, and accordingly, a gain of the sensor K(s)-1 20 changes. However, to accurately calculate the vibration quantity ex(t), which the loop does not follow, regardless of this change, the amplitude of the focus and tracking error e(t) is adjusted to be constant so as to maintain the gain of the sensor K(s)-1 20 constant despite the changes of the laser power and the disc reflection ratio.

Since each block shown in FIG. 3 is modeled as a nominal model (reference model) using nominal parameters, a modeling error may occur by the gain change of the sensor K(s)-1 20.

Those which affect the gain change of the sensor K(s)-1 20 include a change of a linear interval (2F) in the S curve of the focus error, a change of a track pitch (P) of the tracking error, and a change in an amplitude of a focus and tracking error caused by the changes in the laser power or the disc reflection ratio. The linear interval (2F) in the S curve of the focus error is determined by a laser wavelength, or a numerical aperture. However, since the wavelength is affected by a temperature change, etc., and the numerical aperture does not change, respective linear intervals (2F) in the S curve of the focus error may be different from others. As for the track pitch (P) of the tracking error, a change in the track pitch in, for example, a CD is relatively greater than that in a DVD disc, and except a marginal disc, the track pitch changes within about 10%.

A change in the amplitude of the focus and tracking error due to changes in laser power and a disc reflection ratio can be maintained to be constant by adjusting gain parameters of the sensor K(s)-1 20. Thus, the gain of the sensor K(s)-1 20 may differ in each drive, and to compensate for this, a gain control of the sensor K(s)-1 20 which maintains the constant amplitude (A) of the focus tracking error is performed. Then, in a state where the constant amplitude (A) of the focus and tracking error is maintained, the gain of the sensor K(s)-1 20 changes only by a laser wavelength or a track pitch change by a temperature. Since the change in the laser wavelength or the track pitch is relatively small, change of the gain of the sensor K(s)-1 20 is also small. The focus and tracking error signal is amplified by the sensor K(s)-1 20 that is newly modeled by a gain adjustment as described above, and is output. A value obtained by dividing the focus and tracking error signal by a sensor gain (Ksensor) is calculated and output as the vibration quantity ex(t).

2. Calculation of a vibration quantity y(t) which the loop follows:

Referring to FIG. 3, with reference to FIG. 2, a sensitivity of the actuator P(s) 23 is adjusted by adjusting a gain of the loop, and thus, the vibration quantity y(t) which the loop follows is calculated. To accurately calculate the vibration quantity y(t), which the loop follows, change in the sensitivity of the actuator P(s) 23 should be considered.

The vibration quantity y(t), which the loop follows, that is, a vibration quantity y(t) which is followed in the actuator P(s) 23 is calculated as u(t)V(s)P(s). The output u(t) is an output value of the controller C(s) 21 and can be measured in the optical system, and the driver V(s) 22 is a first order LPF and can be accurately modeled. The actuator P(s) 23 is modeled to a second order linear system, using DC sensitivity, a resonance frequency, and a Q sensitivity.

In calculating the vibration quantity y(t) which the loop follows, change in the sensitivity of the actuator P(s) 23 should be considered, and for this, a loop gain adjusting algorithm is used. Through the loop gain adjusting algorithm by which a loop gain is adjusted to be constant, it is determined how much the gain changes as compared to a nominal model. Accordingly, using the loop gain adjusting algorithm, the actuator P(s) 23 can be accurately modeled. Thus, by modeling the actuator P(s) 23, with the change in the sensitivity of the actuator P(s) 23 taken into consideration, the vibration quantity y(t) which the loop follows can be accurately calculated.

Figure 5:
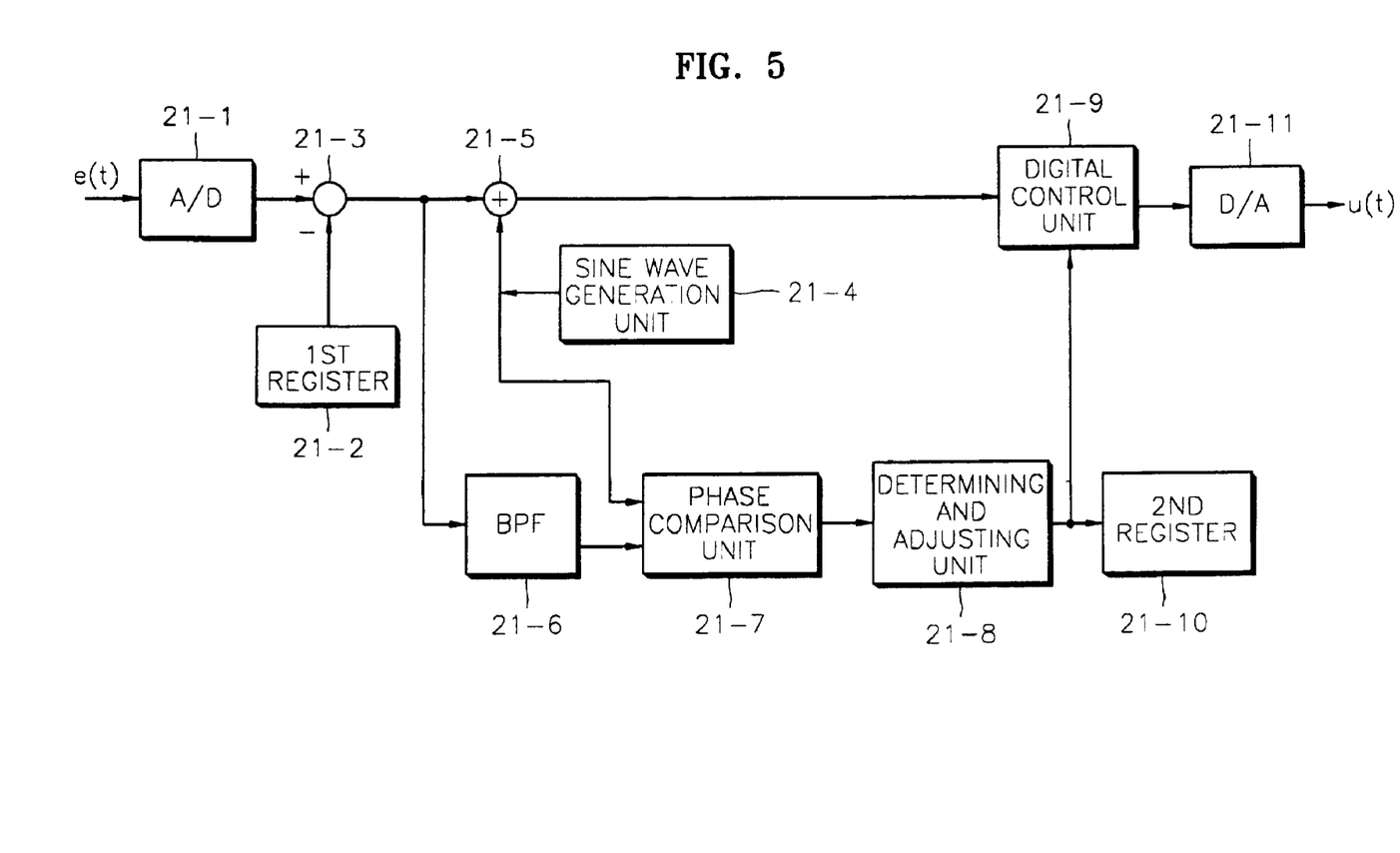
FIG. 5 is a block diagram illustrating a focus and tracking gain adjusting algorithm to adjust the sensitivity change of an actuator shown in FIGS. 2 and 3.

FIG. 5 shows a focus and tracking gain adjusting algorithm which automatically adjusts the sensitivity change of the actuator P(s) 23 according to the present invention. It can be shown that how much the sensitivity of the actuator P(s) 23 change corresponds to how much the gain of the controller C(s) 21 is adjusted. By reflecting the result of adjusting the gain of the loop to the modeling of the actuator P(s) 23, the reliability of a measurement can be improved even for a modeling error that differs in each drive.

The apparatus shown in FIG. 5 comprises an A/D converter 21-1, a first register 21-2, a first calculating unit 21-3, a sine wave generating unit 21-4, a second calculating unit 21-5, a band pass filter (BPF) 21-6, a phase comparison unit 21-7, a determining and adjusting unit 21-8, a digital control unit 21-9, a second register 21-10, and a D/A converter 21-11.

The A/D converter 21-1 converts the focus and tracking error signal e(t), which is output from the sensor K(s) 20 and an amplitude of which is adjusted to be constant, into a digital signal.

The first register 21-2 is used to adjust an offset. Even where a drive does not perform a focus and tracking operation, there may be an offset in a focus and tracking error on a circuit. To remove the offset from the focus and tracking error signal e(t), an offset of each error signal is measured before a focus and tracking control, and is stored in the first register 21-2.

The first calculating unit 21-3 removes the offset signal stored in the first register 21-2 from the output focus and tracking error signal e(t) of the sensor K(s) 20, which is converted into a digital form.

The sine wave generating unit 21-4 generates a sine wave to adjust a gain of the loop (focus and tracking loop). The sine wave generating unit 21-4 may select and output one among 687 Hz, 1.38 kHz, 2.76 kHz, and 5.51 kHz. The amplitude of the provided sine wave can be adjusted.

The second calculating unit 21-5 synthesizes a sine wave having a predetermined frequency to the focus and tracking error signal e(t). A sine wave disturbance having a predetermined frequency added to the focus and tracking error signal e(t) makes a round along the loop and again appears in a focus and tracking error/focus and tracking error signal in the next sample.

The BPF 21-6 extracts only a sine wave disturbance component from the focus and tracking error signal e(t) which has made a round along the loop. Since the focus and tracking error signal e(t) has made a round along the loop, a phase of the focus and tracking error signal e(t), which is input to the BPF 21-6, is delayed for a phase of the closed loop of the provided frequency.

The phase comparison unit 21-7 compares a phase of the sine wave provided from the sine wave generating unit 21-4 and a signal output from the BPF 21-7, and obtains a phase difference. There is a phase difference of a closed loop phase between them.

The determining and adjusting unit 21-8 compares the phase difference output from the phase comparison unit 21-7 and a phase difference of a nominal model (reference phase difference), and according to the difference, adjusts a DC gain of the digital control unit 21-9. Where a gain of the current loop is greater than a gain of a nominal loop, the determining and adjusting unit 21-8 makes the DC gain of the digital control unit 21-9 small, and where the gain of the current loop is smaller than the gain of the nominal loop, it makes the DC gain of the digital control unit 21-9 big so as to maintain the gain of the focus and tracking loop constant. This adjustment of the loop gain is repeatedly performed until the closed loop phase of the focus and tracking loop becomes the same as the closed loop phase of the nominal loop.

The second register 21-10 stores the result of a final loop gain adjustment. Where a vibration quantity is measured, change in the sensitivity of the actuator P(s) 23 is compensated for by reading the result value of the final loop gain adjustment stored in the second register 21-10 and adjusting the DC gain of the actuator P(s) 23.

The output of the digital control unit 21-9 is converted into an analog signal through the D/A 21-11 and is output to the driver V(s) 22. Finally, an output u(t) of the controller C(s) 21 goes through the driver V(s) 22 and the actuator P(s) 23, the DC gain of which is compensated, and becomes the vibration quantity y(t) which the loop follows.

3. Calculation of a final vibration quantity d(t):

Referring to FIG. 3, with reference to FIG. 2, the first calculating unit 30 synthesizes a vibration quantity ex(t), which the loop does not follow, and a vibration quantity y(t) which the loop follows. The OFF(s) 31 removes a DC component of a vibration quantity d1(t). The OFF(s) 31 is formed with a DC LPF, and filters a signal d1(t). Where the OFF(s) 31 is implemented by a program, an average value of 64 samples and 128 samples of the output d1(t) of the first calculating unit 30 is obtained, and an offset value is determined. After removing the offset component of the d1(t), the output d1(t) is output. Accordingly, a final vibration quantity d(t) becomes the output d1(t), the offset component of which is removed.

Figure 6A:
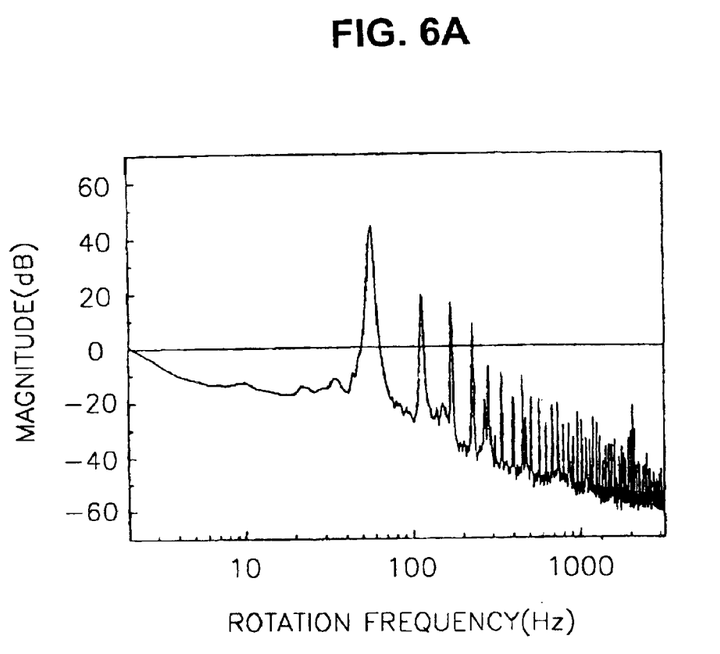
FIGS. 6A and 6B are waveform diagrams showing embodiments of a vibration measuring method according to the present invention.
Figure 6B:
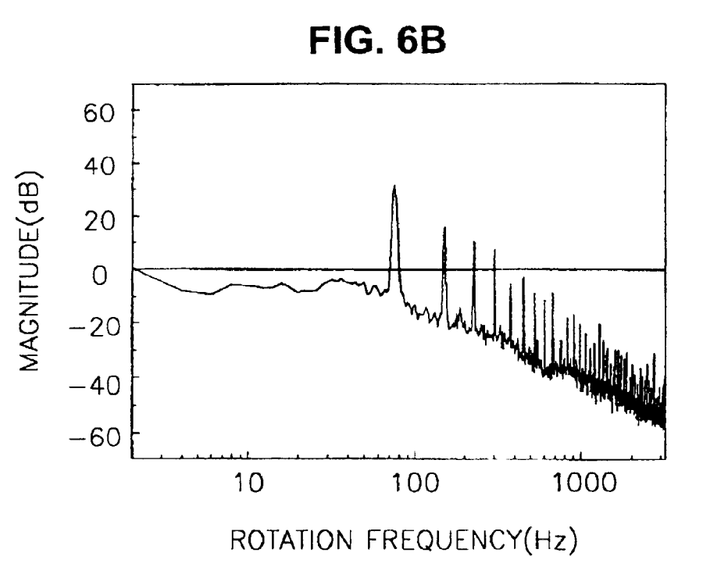

FIGS. 6A and 6B show the characteristics of a vibration quantity frequency. FIG. 6A shows data obtained by measuring focus vibration quantities of a 400 μm-deflection disc, and FIG. 8B shows data obtained by measuring tracking vibration quantities of a 50 μm-concentricity disc. At a disc rotation frequency, a superior vibration occurs, and at a frequency, which is one integer times the disc rotation frequency, a relatively great vibration occurs.

Figure 7:
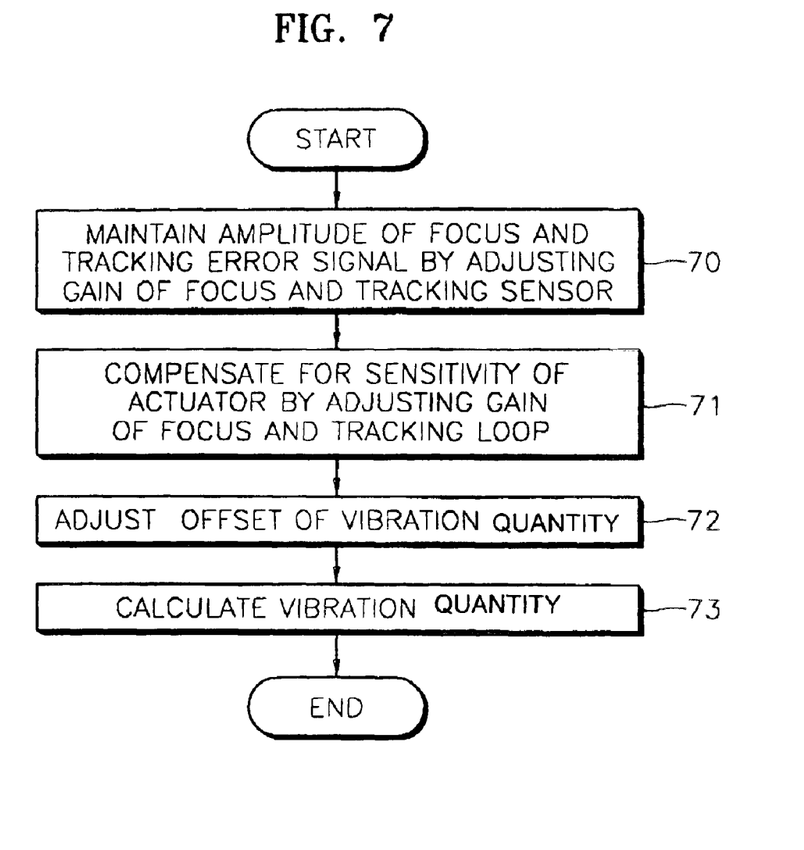
FIG. 7 is a flowchart showing an operation of a vibration measuring method according to the present invention.

FIG. 7 shows a flowchart illustrating an operation of a vibration measuring method according to the present invention. A gain parameter of a focus and tracking sensor is adjusted so as to maintain a constant amplitude of a focus and tracking error signal in operation 70. A DC sensitivity of an actuator is compensated by using the result of adjusting a gain of a focus and tracking loop, constant, in operation 71. An offset of a vibration quantity is removed in operation 72, and a final vibration quantity is calculated in operation 73.

That is, in the operation 70, a gain of the focus and tracking sensor K(s) 20 is adjusted to be constant so as to calculate the vibration quantity ex(t) which the loop does not follow. In the operation 71, a DC sensitivity of the actuator P(s) 23 is compensated to calculate the vibration quantity y(t) which the loop follows. In the operation 72, the vibration quantities ex(t) and y(t) are synthesized and an offset is removed. In the operation 73, a final vibration quantity is measured.

To maintain the constant amplitude of the focus and tracking error, the gain of the sensor K(s) 20 is adjusted in the operation 70. The result of adjusting the gain of the sensor K(s) 20 is as shown in the equation 4 above. The gain of the focus error signal, which is output as an S curve, is adjusted by a value which is obtained by diving the amplitude in a linear interval by a focus linear interval. The gain of the tracking error signal, which is output as a sine wave, is adjusted by a value which is obtained by dividing the amplitude in a linear interval by a track pitch.

To compensate the sensitivity of the actuator P(s) 23, using the focus and tracking error signal, the gain of which is adjusted, the gain of the focus and tracking loop is adjusted in the operation 71. To adjust the gain of the focus and tracking loop, the loop adjusting algorithm of FIG. 5 is used. More specifically, a sine wave to adjust the loop gain is added to the focus and tracking error signal. Then, by obtaining the phase difference between the sine wave disturbance frequency component of the focus and tracking error signal, which has made a round along the focus and tracking loop, and a provided sine wave disturbance frequency, the closed loop phase of the focus and tracking loop is calculated. By comparing the obtained closed loop phase and the nominal closed loop phase (a reference phase), a gain of the focus and tracking controller C(s) 21 is adjusted until the two phases become the same. Based on the result of adjusting the focus and tracking loop gain, the gain of the actuator P(s) 23 is accurately modeled.

Through adjusting gains of the sensor K(s) 20 and the actuator P(s) 23, the sensor K(s) 20 and the actuator P(s) 23 are accurately modeled, and thereafter, a vibration quantity is calculated. A value obtained by dividing the focus and tracking error signal, which is adjusted by adjusting the gain of the sensor K(s) 20, by the sensor gain Ksensor, and an output of the actuator P(s) 23, which is obtained after the output of the controller C(c) 21 is input to the actuator P(s) 22 through the driver V(s) 22, are synthesized.

To remove a DC value of the synthesized signal, an offset value is calculated by obtaining the average of 64 samples and 128 samples, or a filter which removes a DC component is used in the operation 72. Where the offset is removed from the synthesized signal, a final vibration quantity is output in the operation 73.

Figure 8:
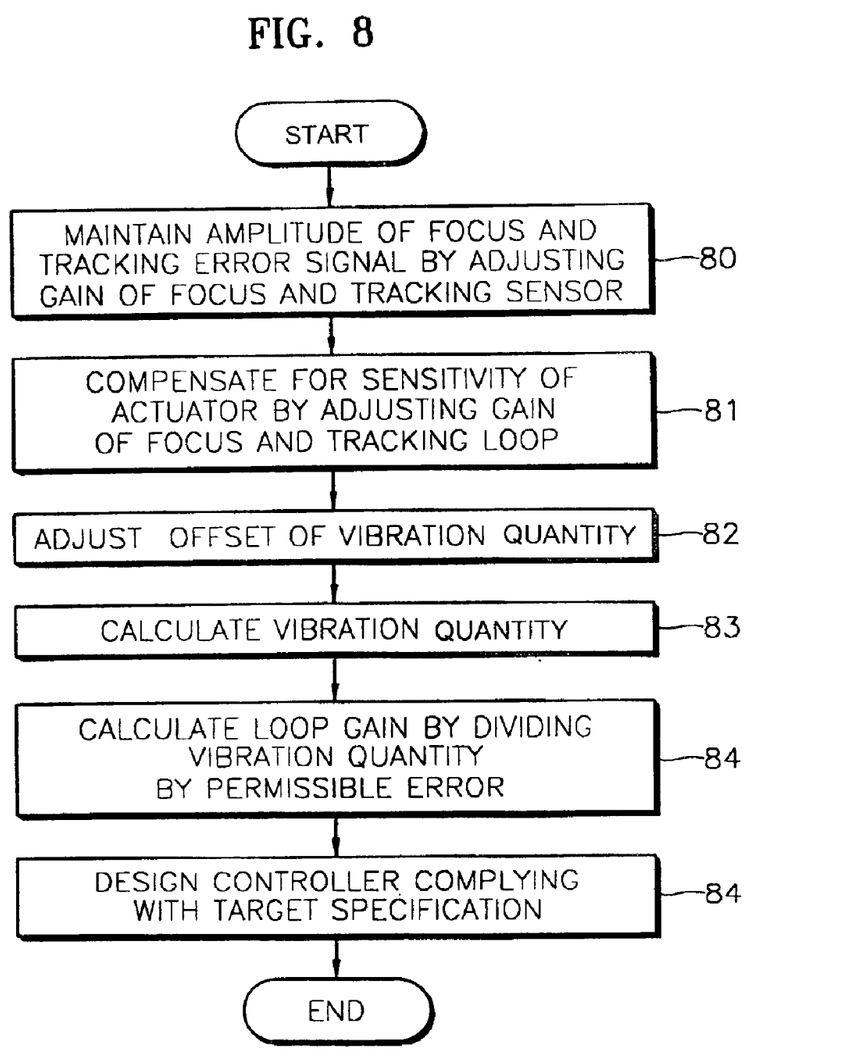
FIG. 8 is a flowchart showing an operation of a loop design method according to the present invention.

FIG. 8 shows a flowchart illustrating a servo loop design method according to the present invention. A gain parameter of a focus and tracking sensor is adjusted so as to maintain a constant amplitude of a focus and tracking error signal in operation 80. A DC sensitivity of an actuator is compensated by using the result of adjusting a gain of a focus and tracking loop, constant, in operation 81. An offset is removed in operation 82, and a vibration quantity is calculated in operation 83. The gain of the focus and tracking loop is calculated by dividing the vibration quantity by a permissible error in operation 84, and a controller which satisfies a target performance is designed in operation 85.

Since the servo loop design method is based on measuring the vibration quantity, explanation of the operations 80 through 83, corresponding to vibration measuring operations, will be omitted. Where the vibration quantity is measured, the measured vibration quantity is divided by the permissible error to obtain a minimum loop gain in the operation 84. Using the minimum loop gain, a controller which satisfies a target performance is designed in the operation 85.

According to the present invention, a focus and tracking vibration quantity of a drive can be measured for each type of a disc which data is recorded on or read from, or for each speed factor of a disc drive. Based on the measured result, an optimal focus and tracking controller can be designed such that a design time can be reduced and design precision can be improved. Where the measured vibration quantity exceeds an extent that is permissible by a servo, vibration quantity data are fed back to a deck mechanism, and can be used as data for a deck design so as to have a vibration quantity that can be considered in a servo design is generated. Additionally, using the measured vibration quantity, actuator design specifications on how high a DC or AC sensitivity of a pickup should be, for stable focus and tracking control, can be set.

Although a few embodiments of the present invention have been shown and described, it will be appreciated by those skilled in the art that changes may be made in these embodiments without departing from the principles and spirit of the invention, the scope of which is defined in the appended claims and their equivalents.

What is claimed is:

1. A vibration quantity measuring apparatus for a disc recording and reproducing system having a focus and tracking loop including a controller which controls focus and tracking of a disc received in the disc recording and reproducing system and an actuator, wherein a vibration occurs in the focus and tracking loop in response to rotating of the disc, the apparatus comprising:

an error gain adjusting unit which adjusts an amplitude of a focus and tracking error, which occurs in response to the rotating of the disc, and maintains the amplitude constant;

a loop gain adjusting unit which compensates for a gain difference the actuator, wherein the loop gain adjusting unit compares a closed loop phase of the focus and tracking loop and a reference closed loop phase, and maintains a gain of the focus and tracking loop constant; and a measuring unit which calculates and outputs a vibration quantity, using the focus and tracking error adjusted by the error gain adjusting unit and the focus and tracking loop adjusted by the loop gain adjusting unit, and an output of the controller which controls the focus and tracking of the disc.

2. The apparatus of claim 1, wherein:

the amplitude is maintained by adjusting a gain of the error gain adjusting unit, and the gain of the error gain adjusting unit includes a focus error, a gain of which satisfies the following relationship:

$$\text{focus error gain} = \frac{A\pi}{2F}$$

where A is the amplitude of the focus and tracking error, and F is a focal length in a linear interval on a curve of the focus error.

3. The apparatus of claim 1, wherein:

the amplitude is maintained by adjusting a gain of the error gain adjusting unit, and the gain of the error gain adjusting unit includes a tracking error, a gain of which satisfies the following relationship:

$$\text{tracking error gain} = \frac{2\pi A}{P}$$

where A is the amplitude of the focus and tracking error, and P is a track pitch of a wave of the tracking error.

4. The apparatus of claim 1, wherein the loop gain adjusting unit comprises:

a sine wave generating unit which generates a predetermined sine wave to adjust the gain of the focus and tracking loop;

a phase signal processing unit which outputs the closed loop phase by comparing a sine wave disturbance component in a digital signal of the focus and tracking error and a phase of the predetermined sine wave; and a gain adjusting unit which compares the closed loop phase and the reference closed loop phase, adjusts the gain of the focus and tracking loop to be constant, and models the gain of the actuator based on the adjustment of the gain of the focus and tracking loop.

5. The apparatus of claim 4, wherein the phase signal processing unit comprises:

a disturbance extracting unit which extracts and outputs only the sine wave disturbance component from the digital signal of the focus and tracking error which is fed back from the focus and tracking loop; and a phase comparison unit which outputs a phase difference obtained by comparing the output of the disturbance extracting unit and a phase of the predetermined sine wave.

6. The apparatus of claim 4, wherein the gain adjusting unit adjusts a gain of the controller so as to have the gain thereof become the reference closed loop phase, and compensates the gain of the actuator as the adjusted gain of the controller.

7. The apparatus of claim 1, wherein:

the amplitude is maintained by adjusting a gain of the error gain adjusting unit, and the measuring unit comprises:

a first vibration quantity measuring unit which measures a first vibration quantity by dividing the focus and tracking error by the adjusted gain of the error gain adjusting unit;

a second vibration quantity measuring unit which measures a second vibration quantity from an output signal of the focus and tracking loop containing the actuator, the gain difference of which is compensated; and an offset adjusting unit which synthesizes the first vibration quantity and the second vibration quantity as a synthesized signal, obtains an average value of the synthesized signal for a predetermined time, and adjusts an offset of the synthesized signal using the obtained average value.

8. The apparatus of claim 7, wherein the offset adjusting unit is a filtering unit which filters the synthesized signal with a predetermined band.

9. A method of measuring a vibration quantity in a disc recording and reproducing system having a focus and tracking loop including a controller which controls focus and tracking of a disc received in the disc recording and reproducing system and an actuator, wherein a vibration occurs in the focus and tracking loop in response to rotating of the disc, the method comprising:

adjusting an amplitude of a focus and tracking error, occurring in response to the rotating of the disc, so as to maintain the amplitude constant;

compensating for a gain difference of the actuator, wherein the compensating for the gain difference comprises:

comparing a closed loop phase of the focus and tracking loop and a phase of a nominal closed loop, and adjusting a gain of the focus and tracking loop to be constant; and calculating the vibration quantity based on the adjusted focus and tracking error and the adjusted gain of the focus and tracking loop, and an output of the controller which is compensated by the adjusted focus and tracking error and gain of the focus and tracking loop.

10. The method of claim 9, wherein:

the adjusting of the amplitude includes adjusting a gain of the focus and tracking error, and the focus and tracking error includes a focus error which is output as an S curve, and a gain of the focus error is adjusted by a value obtained by dividing the amplitude in a linear interval by a focus linear interval of the S curve.

11. The method of claim 9, wherein:

the adjusting of the amplitude includes adjusting a gain of the focus and tracking error, and the focus and tracking error includes a tracking error which is output as a sine wave, and a gain of the tracking error is adjusted by a value obtained by dividing the amplitude in a linear interval by a track pitch of the sine wave.

12. The method of claim 9, wherein the compensating of the gain difference of the actuator further comprises:

extracting only a sine wave disturbance component from the focus and tracking error to which a sine wave to adjust the gain of the focus and tracking loop is input;

outputting the closed loop phase by comparing the sine wave disturbance component extracted from the focus and tracking error and a phase of the sine wave; and outputting a control signal to adjust the gain of the focus and tracking loop by comparing the closed loop phase and the phase of the nominal closed loop, and outputting the control signal as a gain adjusting signal of the actuator.

13. The method of claim 12, wherein the outputting of the control signal includes:

adjusting the gain of the focus and tracking loop so as to have the gain thereof equal to the phase of the nominal closed loop; and compensating the gain of the actuator as the adjusted gain of the focus and tracking loop.

14. The method of claim 9, wherein:

the adjusting of the amplitude includes adjusting a gain of the focus and tracking error, and the calculating of the vibration quantity includes:

measuring a first vibration quantity by dividing the focus and tracking error by the adjusted gain of the focus and tracking error;

measuring a second vibration quantity from an output signal of the focus and tracking loop having the actuator, the gain difference of which is compensated;

synthesizing the first vibration quantity and the second vibration quantity as a synthesized signal; and obtaining an average value of the synthesized signal for a predetermined time, and adjusting an offset of the synthesized signal using the obtained average value.

15. The method of claim 14, wherein the calculating of the vibration quantity further includes filtering the synthesized signal with a predetermined band.

16. A loop design method of a method of measuring a vibration quantity in a disc recording and reproducing system having a focus and track loop including a controller which controls focus and tracking of a disc received in the disc recording and reproducing system and an actuator, wherein a vibration occurs in the focus and tracking loop in response to rotating of the disc, the loop design method comprising:

adjusting an amplitude of a focus and tracking error, occurring in response to the rotating of the disc, so as to maintain the amplitude constant;

compensating for a gain difference of the actuator, wherein the compensating for the gain difference comprises:

comparing a closed loop phase of the focus and tracking loop and a phase of a nominal closed loop, and adjusting a gain of the focus and tracking loop to be constant;

calculating the vibration quantity based on the adjusted focus and tracking error and the adjusted gain of the focus and tracking loop, and an output of the controller which is compensated by the adjusted focus and tracking error and gain of the focus and tracking loop;

calculating a minimum gain of the focus and tracking loop by dividing the vibration quantity by a predetermined permissible error; and resetting the gain of the focus and tracking loop using the calculated minimum gain.

17. The method of claim 16, wherein:

the adjusting of the amplitude includes adjusting a gain of the focus and tracking error, and the focus and tracking error includes a focus error which is output as an S curve, and a gain of the focus error is adjusted by a value obtained by dividing the amplitude in a linear interval by a focus linear interval of the S curve.

18. The method of claim 16, wherein:

the adjusting of the amplitude includes adjusting a gain of the focus and tracking error, and the focus and tracking error includes a tracking error which is output as a sine wave, and a gain of the tracking error is adjusted by a value obtained by dividing the amplitude in a linear interval by a track pitch of the sine wave.

19. The method of claim 16, wherein the compensating of the gain difference of the actuator further comprises:

extracting only a sine wave disturbance component from the focus and tracking error to which a sine wave to adjust the gain of the focus and tracking loop is input;

outputting the closed loop phase by comparing the sine wave disturbance component extracted from the focus and tracking error and a phase of the sine wave; and outputting a control signal to adjust the gain of the focus and tracking loop by comparing the closed loop phase and the phase of the nominal closed loop, and outputting the control signal as a gain adjusting signal of the actuator.

20. The method of claim 19, wherein the outputting of the control signal includes:

adjusting the gain of the focus and tracking loop so as to have the gain thereof equal to the phase of the nominal closed loop; and compensating the gain of the actuator as the adjusted gain of the focus and tracking loop.

21. The method of claim 16, wherein:

the adjusting of the amplitude includes adjusting a gain of the focus and tracking error, and the calculating of the vibration quantity includes:

measuring a first vibration quantity by dividing the focus and tracking error by the adjusted gain of the focus and tracking error;

measuring a second vibration quantity from an output signal of the focus and tracking loop having the actuator, the gain difference of which is compensated;

synthesizing the first vibration quantity and the second vibration quantity as a synthesized signal; and obtaining an average value of the synthesized signal for a predetermined time, and adjusting an offset of the synthesized signal using the obtained average value.

22. The method of claim 21, wherein the calculating of the vibration quantity further includes filtering the synthesized signal with a predetermined band.

23. The apparatus of claim 7, wherein the offset adjusting unit is implemented by a computer having a computer readable medium encoded with an operating instruction to remove an offset component of the first and second vibration quantities.

24. The method of claim 14, wherein the calculating of the vibration quantity further includes using a computer having computer readable medium encoded with an operating instruction to remove an offset component of the first and second vibration quantities.

25. The method of claim 21, wherein the calculating of the vibration quantity further includes using a computer having computer readable medium encoded with an operating instruction to remove an offset component of the first and second vibration quantities.

26. A vibration quantity measuring apparatus for a disc recording and reproducing system having a focus and tracking loop which includes an actuator, wherein a vibration occurs in the focus and tracking loop in response to rotating of a disc received in the system, the apparatus comprising:

an error gain adjusting unit which adjusts a gain of the error adjusting unit and maintains an amplitude of a focus and tracking error signal picked up from the disc constant;

a loop gain adjusting unit which compensates for a gain difference the actuator by comparing a closed loop phase of the focus and tracking loop and a reference closed loop phase, and maintaining a gain of the focus and tracking loop constant; and a measuring unit which determines a vibration quantity of the focus and tracking error signal using the focus and tracking error adjusted by the error gain adjusting unit and the focus and tracking loop adjusted by the loop gain adjusting unit.

27. The apparatus of claim 26, wherein:

the measuring unit determines a control signal which controls focus and tracking of the disc, and the control signal is compensated according to the vibration quantity.

28. The apparatus of claim 26, wherein the vibration quantity measuring apparatus measures the vibration quantity directly from a drive of the disc recording and reproducing system so as to optimally design the focus and tracking loop of the drive.

29. A method of measuring a vibration quantity of a disc in a disc recording and reproducing system having a focus and tracking loop which includes an actuator, wherein a vibration occurs in the focus and tracking loop in response to rotating of the disc, the method comprising:

obtaining a constant amplitude of a focus and tracking error picked up from the disc by adjusting a gain of the focus and tracking error;

compensating for a gain difference of the actuator by comparing a closed loop phase of the focus and tracking loop and a predetermined nominal closed loop phase, and adjusting a gain of the focus and tracking loop to be constant; and determining the vibration quantity based on the adjusted focus and tracking error and the adjusted gain of the focus and tracking loop.

30. The method of claim 29, further comprising determining a control signal corresponding to the vibration quantity, wherein the control signal controls focus and tracking of the disc.

31. The method of claim 29, further comprising designing the focus and tracking loop which includes:

determining a minimum loop gain of the focus and track loop by dividing the vibration quantity by a predetermined permissible error; and resetting the gain of the focus and tracking loop using the calculated minimum gain.

32. The method of claim 29, wherein the vibration quantity is directly measured from a drive of the disc recording and reproducing system so as to optimally design the focus and tracking loop of the drive.

* * * * *

UNITED STATES PATENT AND TRADEMARK OFFICE
CERTIFICATE OF CORRECTION

PATENT NO. : 6,906,986 B2 Page 1 of 1
APPLICATION NO. : 10/230373
DATED : June 14, 2005
INVENTOR(S) : Moon-noh Lee et al.

It is certified that error appears in the above-identified patent and that said Letters Patent is hereby corrected as shown below:

Column 14, Line 22, Claim 16, after "method of" delete "a method of".

Signed and Sealed this

Twenty-ninth Day of April, 2008

JON W. DUDAS
*Director of the United States Patent and Trademark Office*